UNITED STATES PATENT OFFICE.

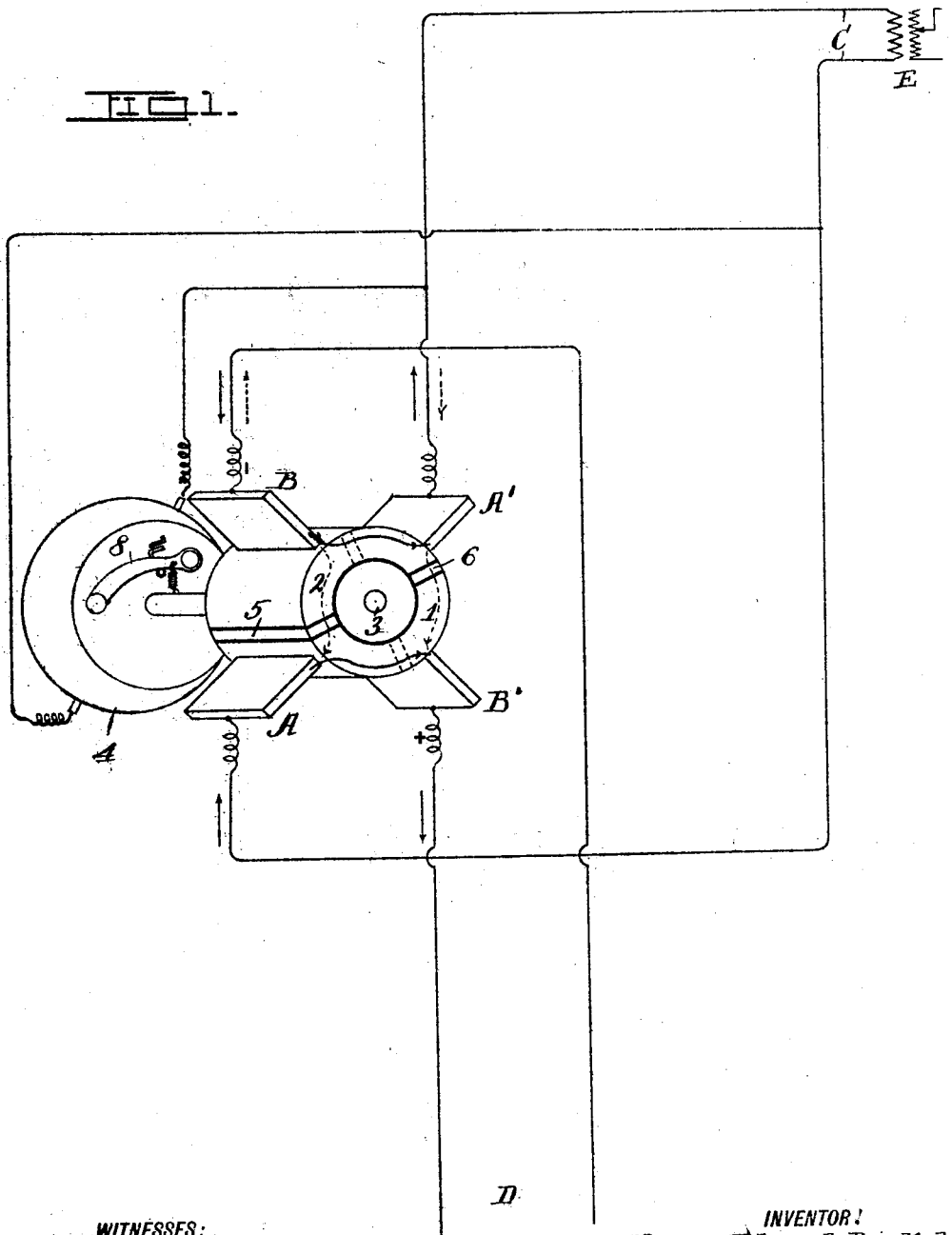

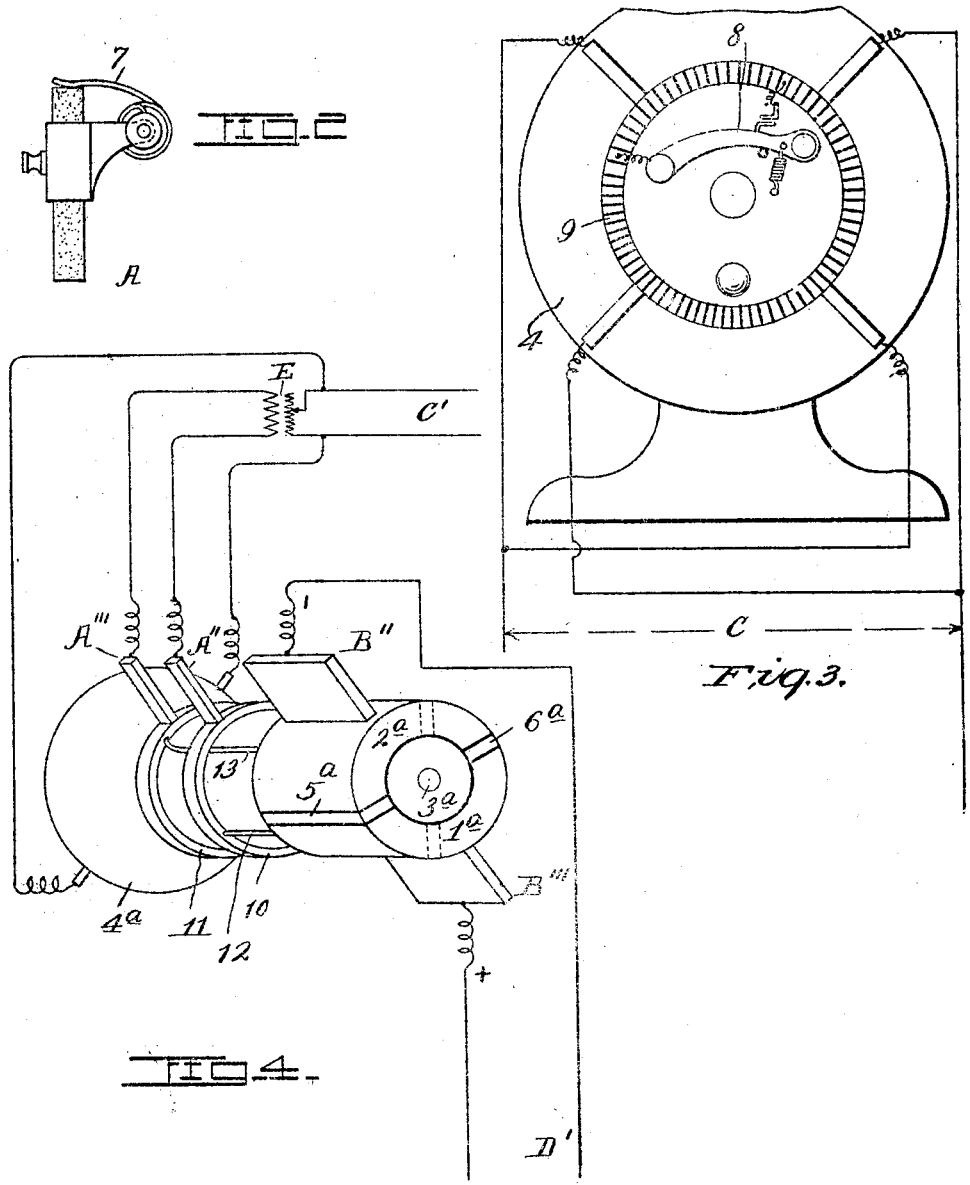

HENRY EDWARD BURKET, OF LEAVENWORTH, KANSAS, ASSIGNOR OF ONE-HALF TO ERNEST ELGIN LYNCH, OF LEAVENWORTH, KANSAS.

RECTIFIER.

1,243,807.  Specification of Letters Patent.  Patented Oct. 23, 1917.

Application filed June 5, 1916. Serial No. 101,775.

*To all whom it may concern:*

Be it known that I, HENRY EDWARD BURKET, a citizen of the United States, residing at Leavenworth, in the county of Leavenworth and State of Kansas, have invented certain new and useful Improvements in Rectifiers, of which the following is a specification.

My invention relates to rectifiers for converting alternating electric currents of medium or commercial frequency into pulsatory direct currents.

In its most simple form the invention may be said to embody both rotary and stationary conductors, said rotary conductors being two or more in number and arranged about a common axis driven by a motor in synchronism with the alternations of the current. The rotary conductors are insulated from each other by suitable insulated segments.

The stationary conductors consist, preferably, of carbon brushes arranged to bear against the rotary conductors. Sparking at the brushes is avoided by making the same narrower than the insulated segments, thus insuring the passage of one rotary conductor out of contact with a brush before the following conductor moves into contact with said brush, and by having said insulated segments pass into contact with the brushes synchronously with the alternations or changes in direction of the current at which time the electromotive force thereof is, approximately, at zero.

Other embodiments of the invention contemplate the use of collector rings where a high speed of the rotary parts is necessary to maintain proper relation to the frequency of the alternations.

Among the advantages derived by the use of my invention may be mentioned; first, higher efficiency; second, greater durability; and third, lower cost than is attainable with motor generators and rotary transformers now in general use for converting alternating into direct currents.

Other objects and advantages of the invention will hereinafter appear, and in order that said invention may be fully understood, reference will now be made to the accompanying drawings, in which:

Figure 1 is a diagram of the preferred form of invention.

Fig. 2 is a detail of a brush and its holder.

Fig. 3 is a detail of a governor for the motor.

Fig. 4 is a modified form in which collector rings are employed.

Referring now in detail to the various parts, 1 and 2 designate a pair of rotary conductors spaced about the shaft 3 of a motor 4 and separated from each other by two diametrically opposed insulated segments 5 and 6.

Spaced about the rotary parts are four brushes A, A', and B, B' arranged at an angle of 90° to each other and mounted in the usual manner, so that they may be adjusted circumferentially to different positions about said rotary parts when desired. Said brushes, as they wear, are automatically fed against the rotary parts by suitable springs 7.

C designates an alternating current line, one terminal of which is in circuit with the brush A, while the opposite terminal is in circuit with the brush A'.

D designates the direct current line, one terminal of which is in circuit with the negative brush B, while the other terminal is in circuit with the positive brush B'.

When the parts are in the position disclosed by the diagram, Fig. 1, pulses from the line C pass through the brush A, the rotary conductor 1, and out to the line D through the positive brush B', returning to said line C through the negative brush B, the rotary conductor 2, and the brush A', as disclosed by the full line arrows.

When the alternating current reverses it enters the direct current D through the brush A', the rotary conductor 2, and the brush B', and returns through the brush B, the rotary conductor 1, and the brush A, as disclosed by the dotted arrows.

When the rotary conductors 1 and 2 pass out of contact with either set of brushes, no sparking occurs as the alternating current is at zero, and the insulated segments 5 and 6 are in contact with two of the brushes.

Thus it will be understood that while the current in the circuit C is alternating, it is converted into direct current in the circuit D through the intermediacy of the brushes and the rotary members about which said brushes are disposed.

Since it is important that the motor which drives the shaft 3 run in synchronism with the alternations, I provide a governor 8 to short circuit two or more different segments on the motor commutator 9 should this become necessary to prevent "hunting" of the motor.

In the modified form disclosed by Fig. 4, two collector rings 10 and 11, are substituted for the two brushes A and A' of the preferred form. The collector ring 10 is connected to the rotary conductor 1ª by a rod or wire 12, while the collector ring 11 is connected to the rotary conductor 2ª by a rod or wire 13.

Brushes A'' and A''' bearing upon the collector rings 10 and 11, respectively, connect with two terminals of the alternating circuit C'.

The direct circuit D' has two terminals communicating with brushes B'' and B''', disposed about the rotary conductors 1ª and 2ª which are insulated from each other by insulated segments 5ª and 6ª.

A pulsation from the alternating circuit C', on entering the brush A'' passes to the positive side of the direct circuit D' through the collector ring 10, the rod 12, the rotary conductor 1ª and the brush B''', and returns to said alternating circuit through the brush B'', the rotary conductor 2ª, the rod 13, the collector ring 11, and the brush A'''. After the alternating current changes, which change occurs at the time the insulated segments 5ª and 6ª are beneath the brushes B'' and B''', the pulsation passes to the direct circuit D' through the brush A''', the collector ring 11, the rod 13, the rotary conductor 2ª, and the brush B''', and returns to the alternating circuit through the brush B'', the rotary conductor 1ª, the rod 12, the collector ring 10, and the brush A''. Thus it will be understood that while the current in the circuit C' alternates, the current in the direct circuit D' always enters the same through the brush B''' and leaves through the brush B''.

In both the preferred and modified forms, a transformer E is interposed in the alternating circuit C', to which latter the motor 4 is connected as shown.

From the foregoing description, it is apparent that I have produced simple and inexpensive means whereby all of the advantages above enumerated are obtained, and while I have shown two forms of my invention, I reserve the right to make such other changes in the construction, combination, and arrangement of parts as properly fall within the spirit and scope of the claims.

Having thus described my invention, what I claim and desire to secure by Letters Patent, is:

1. In a rectifier, a motor, insulated rotary conductors on the motor shaft, stationary conductors bearing against the rotary conductors and adapted to be arranged in alternating and direct circuits, and a centrifugally closed switch on the motor for partially short circuiting the same.

2. In a rectifier, a motor, insulated rotary conductors on the motor shaft, stationary conductors bearing against the rotary conductors and adapted to be arranged in alternating and direct circuits, and speed controlled means for short circuiting certain of the commutator segments of the motor armature to maintain synchronism between the motor and alternations of the alternating circuit.

3. In combination with an alternating circuit and a direct circuit, stationary conductors communicating with the alternating circuit, stationary conductors communicating with the direct circuit, rotary conductors insulated from each other and coacting with the stationary conductors in changing the alternating current into direct current in its passage to the direct circuit, a synchronous motor driven by the alternating current and arranged to drive the rotary conductors, and a governor on said motor operable by centrifugal action for short circuiting certain of the commutator segments of the latter.

In testimony whereof I affix my signature, in the presence of two witnesses.

HENRY EDWARD BURKET.

Witnesses:
F. G. FISCHER,
L. J. FISCHER.